Sept. 6, 1955  A. H. BLOCK  2,716,862
FUEL REGULATING VALVE MECHANISM
Filed April 26, 1950  2 Sheets-Sheet 1

INVENTOR.
ARNOLD H. BLOCK
BY
ATTORNEY

Sept. 6, 1955   A. H. BLOCK   2,716,862
FUEL REGULATING VALVE MECHANISM
Filed April 26, 1950   2 Sheets-Sheet 2

INVENTOR.
ARNOLD H. BLOCK
BY
ATTORNEY

United States Patent Office 2,716,862
Patented Sept. 6, 1955

2,716,862

FUEL REGULATING VALVE MECHANISM

Arnold H. Block, Hackensack, N. J., assignor to Bendix Aviation Corporation, Teterboro, N. J., a corporation of Delaware Application April 26, 1950, Serial No. 158,170

4 Claims. (Cl. 60—39.28)

The present application relates to improvements in a fuel regulator mechanism for use in regulating the flow of fuel to the combustion chamber of a turbo-prop or turbo-jet engine. The fuel regulator mechainism may be operated by a suitable control system such as shown and described in the copending U. S. application Ser. No. 156,260 filed April 17, 1950, by William E. Brandau.

An object of the invention is to provide a pressure regulating device which by means of a by-pass valve may control the fuel pressure in the line leading to the fuel nozzle in the combustion chamber and regulate such pressure to a value determined by ram pressure and a selecting mechanism.

Another object of the invention is to provide a fuel regulator valve operated by an automatic control system together with an emergency manual control to operate such regulator and to override the automatic control system.

Another object of the invention is to provide such a regulating valve which allows for fuel pressure control within the full operating range by both the primary and manual control, and further provides means for compensating the primary control for changes in altitude.

Another object of the invention is to provide improved means for making the differential pressure across the fuel valve proportional to absolute pressure of such air through the provision of suitable ram air inlet pressure responsive compensating means.

Another object of the invention is to provide means to control the fuel flow within an operating range, together with additional means for effecting quick and complete shut off of fuel flow to the engine.

Figure 1:
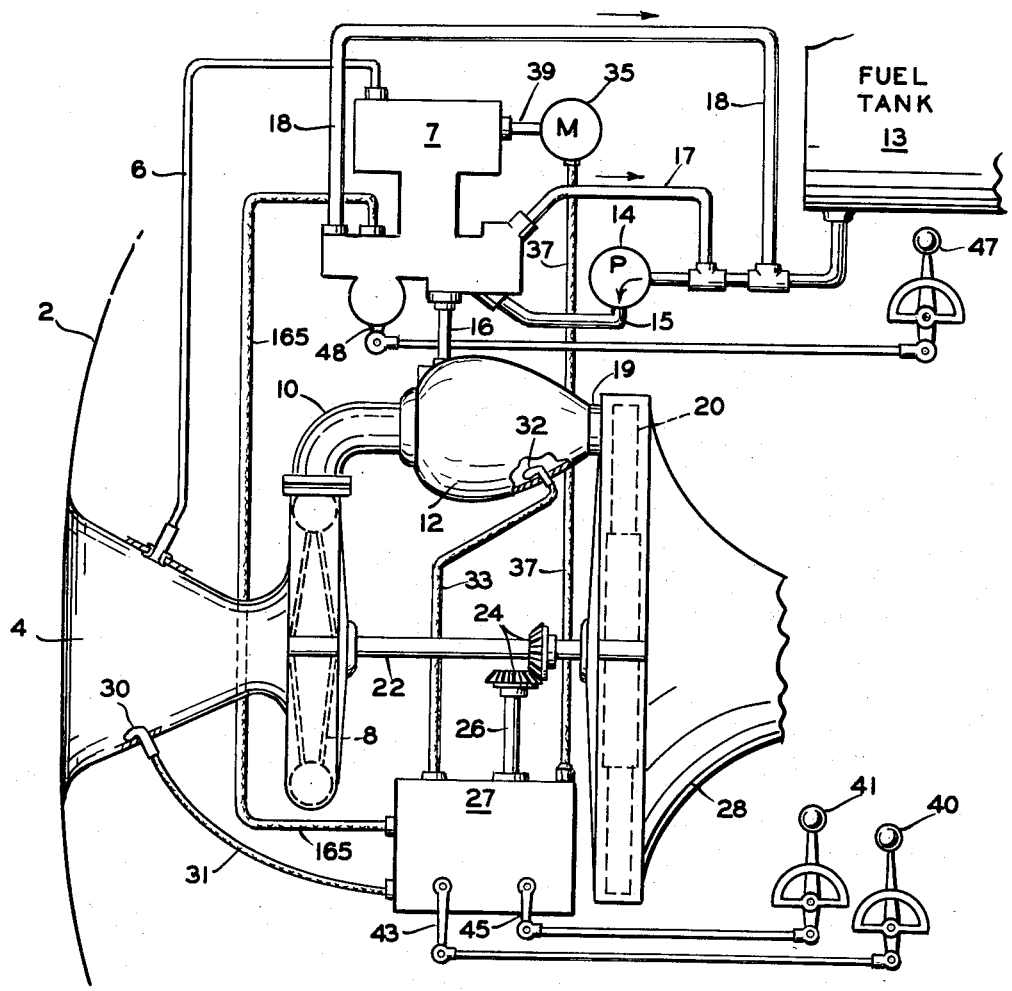
Figure 1 is a diagrammatic view illustrating a typical turbine engine control system with which the fuel pressure regulator of the present invention is designed for use.

Referring to Figure 1, there is shown an engine mounted within a body 2, e. g. the nacelle of an aircraft which moves toward the left so that air is rammed into an intake 4 with a pressure conduit 6 opening therefrom into a fuel pressure regulator 7 to vary the pressure setting of the regulator in response to changes in altitude and speed of the aircraft as hereinafter explained.

The ram air is compressed by a blower or compressor 8 and flows through a conduit 10 into a combustion chamber 12. Fuel from a supply tank 13 is fed under pressure of a pump 14 through a conduit 15 to the fuel pressure regulating mechanism 7 and through the regulating mechanism 7 to a fuel outlet line 16 and a suitable fuel nozzle or nozzles, not shown, in the combustion chamber 12.

The regulating mechanism 7 includes a by-pass valve hereinafter explained by means of which fuel at a regulated pressure is fed through line 16 into the combustion chamber 12 and excess fuel is returned through a by-pass conduit 17 to the inlet of the pump 14. A drain conduit 18 also leads from the regulator 7 to the inlet of the pump 14.

The products of combustion flow out through a nozzle 19 to drive a turbine wheel 20 which drives the compressor 8 through a shaft 22. Gearing 24 and a shaft 26 connect the turbine shaft 22 with a speed governor of a controller 27 while the turbine exhaust exits through a jet tube 28. The controller 27 may be of the type disclosed in the said copending U. S. application Serial No. 156,260.

A temperature responsive device 30 sensitive to the temperature of the air at the intake 4 is operably connected through the conduit 31 to the controller 27 for purposes explained in the latter application while a temperature responsive device 32 is positioned at a suitable point in the combustion chamber 12 for sensing the temperature of the combustion gases. The device 32 is operably connected through conduit 33 to the controller 27 so as to regulate with the speed governor the operation of a reversible motor 35 connected through an electrical conduit 37 with the controller 27 to maintain preselected temperature and turbine speed conditions.

The motor 35 drives a shaft 39 for varying the fuel pressure setting of the fuel pressure regulator 7 as determined by the controller 27 in response to the turbine speed and combustion chamber gas temperature.

Manually operable levers 40 and 41 are arranged to position through suitable linkage a combustion chamber gas temperature selector lever 43 and turbine speed selector lever 45 respectively as explained in the aforenoted application.

Manual control of the fuel pressure regulator 7 may be effected through an emergency lever 47 operably connected to a manual cut-off and emergency control lever 48 of the regulator 7, as hereinafter explained.

*Fuel pressure regulator*

Figure 2:
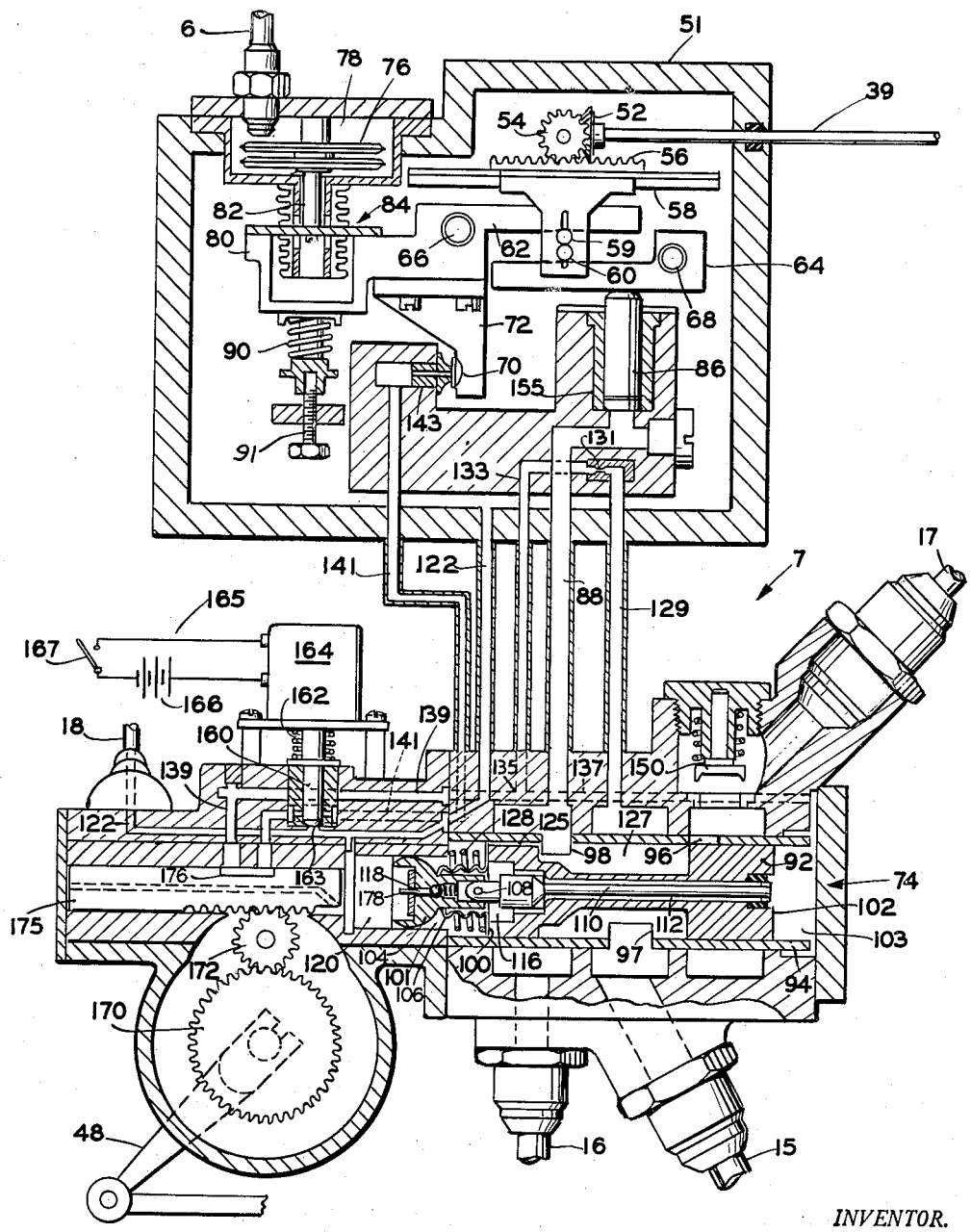
Figure 2 is a sectional schematic view illustrating the fuel pressure regulator.

Referring to the drawing of Figure 2, there is indicated by numeral 39 the control shaft of the regulator 7 driven by motor 35 of Figure 1. As heretofore explained, the motor 35 is controlled by an electro-mechanical system indicated generally by the numeral 27 and which may be of the type heretofore described and claimed in the said copending application Serial No. 156,260.

The shaft 39 projects into casing 51 of the regulator 7 to operate gearings 52 and 54 to adjust a rack 56 along a track 58 mounted in the casing 51. The rack 56 carries roller bearing elements 59 and 60 which provide a movable fulcrum for levers 62 and 64 pivoted at 66 and 68 respectively.

This lever system senses the required power setting, the inlet ram pressure of the aircraft, and the pressure of the fuel going to the engine nozzles as hereinafter described. If the fuel pressure required by the particular power setting and engine ram pressure is not met, the lever system 59—68 moves a pilot valve 70 carried by an arm 72 of the lever 62 which causes a by-pass fuel valve piston 74 to be adjusted hydraulically so as to effect the selected fuel pressure. It should be noted that the use of a by-pass valve arrangement rather than a throttling valve permits pump pressure to be very nearly equal to nozzle pressure, thereby eliminating the continuous high pressure operation of the fuel pump.

The required power setting is fed into the sensing lever system 59—68 in terms of the position of the movable fulcrum roller bearings 59 and 60 carried by the rack 56. Each position of the roller fulcrum bearing 59 and 60 represents a particular power setting within the operating range from idle to take-off. The engine ram air inlet pressure is transmitted to the lever systems 59—68 in terms of a force exerted by an evacuated bellows 76 in a chamber 78 subjected to the existing inlet air ram pressure applied through conduit 6. The bellows 76 acts on an arm 80 of the lever 62 through a rod 82 movably mounted in a balanced sealing bellows arrangement 84.

The actual nozzle pressure is sensed by means of a piston 86 active on the lever 64 and subjected to the nozzle pressure applied through a passage 88 leading from the fuel outlet conduit 16. The piston 86 acting under nozzle fuel pressure tends to bias the lever 64 in a clockwise direction tending in turn to bias the lever 62 in a counter-clockwise direction to move valve 70 in an opening direction and further acting in additive relation to the air inlet pressure acting on bellows 76 and in opposition to the biasing force of a spring 90 which may be adjusted by a calibrating screw 91. These forces are either in equilibrium or activate the pilot valve 70.

The pilot valve 70 controls the position of the by-pass valve 74 which consists of a sliding piston 92 within a valve sleeve 94 having ports 96, 97 and 98. The piston 92 is of differential area. The effective area of the piston end portion 100 exposed to a pressure medium in a chamber 101 is less than the effective area of the piston end portion 102 exposed to a pressure medium in chamber 103. A spherical segment 104 is universally connected at the end 100 of the piston 92 by means of a flexible sealing member 106. The segment 104 is also pivotally connected at 108 to a rod 110 which extends longitudinally through the piston 92. A passage 112 extends along the rod 110 from the chamber 103 to a chamber 116 in the piston 92. A spring pressed ball valve 118 controls the opening of chamber 116 to a chamber 120 at the opposite end of the piston 92 and opening into a passage 122 leading from the interior of casing 51 to the drain conduit 18. A channel 125 in the piston end portion 100 opens the chamber 101 to the full fuel pump pressure applied in chamber 127 from the fuel input line 15 while a light spring 128 normally biases the piston 92 toward the chamber 103.

A conduit 129 also leads from the fuel input line through a restriction 131 and a conduit 133 to a T connection 135 from which conduit 137 leads to the chamber 103, while conduits 139 and 141 lead in turn from the T connection to a valve port 143 controlled by the pilot valve 70.

It will be seen then that as the pilot valve 70 tends to close valve port 143, servo pressure is built up in the chamber 103 acting against the end portion 102 and tending to bias the piston 92 to the left against the biasing force of the light spring 128 and the force applied at the less effective area of the end portion 100 by the full fuel pump pressure. As the pilot valve 70 tends to open valve port 143, the servo pressure in chamber 103 decreases so that the full fuel pump pressure applied in chamber 101 tends to bias the piston 92 toward the right. As will be seen, movement of the piston 92 toward the left tends to close by-pass port 96 and open port 98 leading to the fuel outlet conduit 16 and thereby increase the fuel nozzle pressure, while movement of the piston 92 toward the right tends to open by-pass port 96 and close port 98 and thereby decrease the fuel nozzle pressure. The by-pass port 96 opens to the fuel by-pass line 17. There is provided between the fuel by-pass line 17 and the port 96 a spring loaded poppet type restriction valve 150 for the purpose of closing the by-pass line 17 so as to provide an operating pressure greater than drain pressure in order to start up from a complete cut-off position. Once the system is in operation, the valve 150 is pushed to the near wide open position.

It will be seen then that if the lever system 59—68 calls for a higher fuel nozzle pressure, it causes the pilot valve 70 to further close the valve port or orifice 143. Thus flow through the valve port 143 is decreased and therefore the pressure drop due to fluid flow through the port 143 is decreased and the servo pressure in chamber 103 will approach the pump inlet pressure. Due to the low drain pressure in chamber 120 at the left side of the by-pass piston 92 and the small effective area of the end portion 100 exposed to the pump pressure in chamber 101, the increased servo pressure in chamber 103 is unbalanced and the piston 92 moves to the left thereby tending to close the by-pass port 96 and opening the fuel outlet port 98 and increasing the pump and fuel nozzle pressures. As this occurs, the fuel nozzle pressure sensing piston 86 reacts to the increase of nozzle fuel pressure and as soon as the desired pressure is exceeded the pilot valve 70 opens. It will be seen then that the bleeding of fluid through the orifice 143 causes the servo pressure applied in chamber 103 to decrease below the pump pressure applied in chamber 101 enabling the piston 92 to be pushed to the right opening the by-pass port 96 and decreasing the fuel nozzle pressure in line 16.

The nozzle fuel pressure sensing piston 86 has a rubber washer 155 to prevent the fluid under nozzle pressure from leaking up around the walls of the piston 86, thereby causing pressure unbalance and friction.

Figure 3:
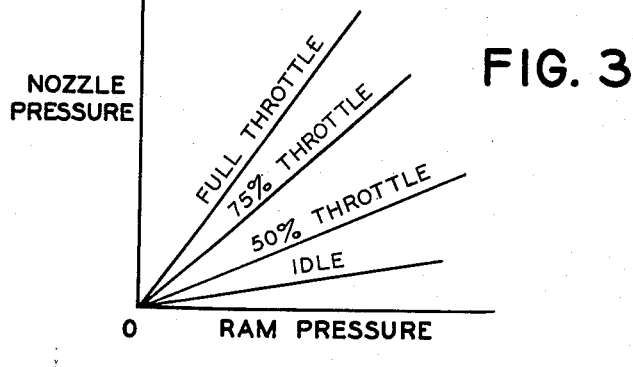
Figure 3 illustrates graphically the operational characteristics of the fuel pressure regulator.

In actual operation, the piston 92 oscillates rapidly at the proper position to maintain a steady regulated fuel pressure in the line 16. The characteristics of the fuel pressure regulator upon changes in the ram air pressure are indicated graphically by Figure 3.

*Electrical cut-off means*

Incorporated into the unit are two separate means for cutting out of operation the aforenoted automatic control. One is by means of a cut-off servo valve 160 which is normally biased by a spring 162 to close a port 163 but which valve 160 may be activated by a solenoid 164 into a position opening a port 163 so that the pilot valve 70 is by-passed and the passage 141 is opened directly to the drain line 122, thereby decreasing the servo pressure applied to chamber 103 to cause piston 92 to move to the right fully closing fuel outlet port 98 and fully opening the by-pass port 96 to thereby cut-off the supply of fuel to the fuel nozzle supply line 16.

Energization of the solenoid 164 may be controlled by a suitable control circuit including conductors 165, a source of electrical energy or battery 166 and a switch 167.

The switch 167 may be manually actuated by the pilot to a closed position to terminate the operation of the engine, or the switch 167 may be in the controller 27 and actuated to a closed position by the speed governor therein at either predetermined low or high speed conditions of the turbine or may be actuated by the pilot manually positioning lever 43 or 45 to a predetermined cut-off position at which the switch 167 is actuated through the lever 43 or 45 to a closed position.

Upon energization of the solenoid 164, the solenoid operated cut-off valve 160 causes the servo pressure in chamber 103 to be bled to low drain pressure. This causes the piston 92 to be quickly pushed completely toward the fuel nozzle cut-off position (towards right) by the spring 128 and the pressure difference between the drain and pump pressures acting on the differential area of the piston 92. The spring 128 holds the piston 92 in cut-off when all pressures are off.

*Manual control and cut-off means*

In case of electric power failure, failure of the automatic pressure regulating valve of the control unit 7 itself, or for manual ground operation, a positive manual cut-off and pressure control is also provided, to be actuated by the manual cut-off and emergency control lever 48 operatively connected to the emergency lever 47.

In addition to providing a positive cut-off, this lever 48 acts as an emergency manual control which overrides the electrical system and enables full manual control between full pressure to cut-off. This emergency manual control is independent of the "failed condition" of the electrical system.

The lever 48 positions through gearings 170 and 172 a rack piston 175 having a valve passage 176 which opens passage 139 to passage 141. Initial movement of the rack piston 175 causing an adjustment of the passage 176 so as to close the opening of passage 139 to passage 141 and pilot valve port 143 and permit servo pressure to build up in the chamber 103 pushing the piston 92 toward the left until a stem 178 of the ball valve 118 contacts the end of the rack piston 175 opening the ball valve 118 and permitting servo pressure in the chamber 103 to escape through the channel 112 to chamber 100 and from chamber 100 to the chamber 120 and thus to drain through passage 122 and conduit 18.

The ball valve 118 thus prevents the piston 92 from pushing the rack piston back from its manually adjusted position and enables the rack piston 175 under manual force exerted through the lever 48 to push the piston 92 any amount towards the right to manually control the fuel pressure to the conduit 16. Moreover, the piston 92 will follow the rack piston 175 as it is retracted towards the left due to the servo pressure applied to chamber 103 until such time as passage 139 is opened to the passage 141 through the opening 176 to return the same to automatic control.

Although only one embodiment of the invention has been illustrated and described, various changes in the form and relative arrangements of the parts may be made to suit requirements.

What is claimed is:

1. For use in regulating the flow of fuel to the combustion chamber of an engine having an air inlet conduit, a conduit for supplying fuel under pressure, and a fuel by-pass conduit; the combination comprising a by-pass valve adjustably positioned for regulating the flow of fuel from said fuel supply conduit to the combustion chamber and to said by-pass conduit, means for controlling the position of said by-pass valve including air inlet pressure responsive means, combustion chamber fuel pressure responsive means, a servo valve mechanism for controlling the position of said by-pass valve under force of said fuel supply pressure, linkage means for operatively connecting the air inlet pressure responsive means and the combustion chamber fuel pressure responsive means to said servo valve mechanism, and said linkage means having an adjustable fulcrum means for varying the operating relationship between said air inlet pressure responsive means and the combustion chamber fuel pressure responsive means.

2. For use in regulating the flow of fuel to the combustion chamber of an engine having an air inlet conduit, a conduit for supplying fuel under pressure, and a fuel by-pass conduit; the combination comprising a by-pass valve adjustably positioned for regulating the flow of fuel from said fuel supply conduit to the combustion chamber and to said by-pass conduit, means for controlling the position of said by-pass valve including air inlet pressure responsive means, combustion chamber fuel pressure responsive means, a servo valve mechanism for controlling the position of said by-pass valve under force of said fuel supply pressure, linkage means for operatively connecting the air inlet pressure responsive means and the combustion chamber fuel pressure responsive means to said servo valve mechanism, said linkage means having an adjustable fulcrum means for varying the operating relationship between said air inlet pressure responsive means and the combustion chamber fuel pressure responsive means, and operator-operative means for overriding said servo valve mechanism to provide manual control of said by-pass valve.

3. For use in regulating the flow of fuel to the combustion chamber of an engine having an air inlet conduit, a conduit for supplying fuel under pressure, and a fuel by-pass conduit; the combination comprising a by-pass valve adjustably positioned for regulating the flow of fuel from said fuel supply conduit to the combustion chamber and to said by-pass conduit, means for controlling the position of said by-pass valve including air inlet pressure responsive means, combustion chamber fuel pressure responsive means, a servo valve mechanism for controlling the position of said by-pass valve under force of said fuel supply pressure, linkage means for operatively connecting the air inlet pressure responsive means and the combustion chamber fuel pressure responsive means to said servo valve mechanism, said linkage means having an adjustable fulcrum means for varying the operating relationship between said air inlet pressure responsive means and the combustion chamber fuel pressure responsive means, manually operable means for overriding said servo valve mechanism, and another valve mechanism operated by said manually operable means for varying the position of said by-pass valve under force of said fuel supply pressure to provide manual control of the position of said by-pass valve.

4. For use in regulating the flow of fuel to the combustion chamber of an engine having an air inlet conduit, a conduit for supplying fuel under pressure, and a fuel by-pass conduit; the combination comprising a longitudinally movable by-pass valve for regulating the flow of fuel from said fuel supply conduit to the combustion chamber and to said by-pass conduit, a servo valve mechanism for controlling the position of said by-pass valve under force of said fuel supply pressure, air inlet pressure responsive means, combustion chamber fuel pressure responsive means, linkage means for operatively connecting the air inlet pressure responsive means and the combustion chamber fuel pressure responsive means to said servo valve mechanism, said linkage means including adjustable fulcrum means for varying the operating relationship between said air inlet pressure responsive means and the combustion chamber fuel pressure responsive means, a first operator-operative means for overriding said servo valve mechanism to position said by-pass valve so as to cut off the flow of fuel to said combustion chamber, and a second operator-operative means including a manually operable means for overriding said servo valve mechanism, and another valve mechanism carried by said by-pass valve and operated by said manually operable means to control the position of said by-pass valve under force of said fuel supply pressure to provide manual control of the position of said by-pass valve.

References Cited in the file of this patent

UNITED STATES PATENTS

| | | |
|---|---|---|
| 2,414,322 | Mock | Jan. 14, 1947 |
| 2,441,948 | Atkinson | May 25, 1948 |
| 2,457,595 | Orr | Dec. 28, 1948 |
| 2,487,774 | Schipper | Nov. 8, 1949 |